(12) United States Patent
Zeng et al.

(10) Patent No.: US 12,224,429 B2
(45) Date of Patent: Feb. 11, 2025

(54) NEGATIVE ELECTRODE PLATE, SECONDARY BATTERY, AND APPARATUS THEREOF

(71) Applicant: CONTEMPORARY AMPEREX TECHNOLOGY (HONG KONG) LIMITED, Hong Kong (CN)

(72) Inventors: Yuqun Zeng, Fujian (CN); Chengdu Liang, Fujian (CN); Chuanmiao Yan, Fujian (CN); Jinhua Liu, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 330 days.

(21) Appl. No.: 17/460,723

(22) Filed: Aug. 30, 2021

(65) Prior Publication Data

US 2021/0391572 A1    Dec. 16, 2021

Related U.S. Application Data

(63) Continuation of application No. PCT/CN2020/077138, filed on Feb. 28, 2020.

(30) Foreign Application Priority Data

Mar. 1, 2019    (CN) .......................... 201910155560.7

(51) Int. Cl.
*H01M 4/134* (2010.01)
*H01M 4/1395* (2010.01)
(Continued)

(52) U.S. Cl.
CPC ........... *H01M 4/366* (2013.01); *H01M 4/134* (2013.01); *H01M 4/364* (2013.01); *H01M 4/386* (2013.01);
(Continued)

(58) Field of Classification Search
None
See application file for complete search history.

(56) References Cited

U.S. PATENT DOCUMENTS

| 9,543,568 B2 | 1/2017 | Sung et al. |
| 10,243,205 B2 | 3/2019 | Sugimori et al. |

(Continued)

FOREIGN PATENT DOCUMENTS

| CN | 101969114 A | 2/2011 |
| CN | 102426924 A | 4/2012 |

(Continued)

OTHER PUBLICATIONS

International Search Report dated May 28, 2020 issued in PCT/CN2020/077138.

*Primary Examiner* — Yoshitoshi Takeuchi
(74) *Attorney, Agent, or Firm* — Kilpatrick Townsend & Stockton LLP

(57) ABSTRACT

A negative electrode plate, a secondary battery and an apparatus thereof are provided in the present application. The negative electrode plate includes a negative electrode current collector and a negative membrane disposed on the negative electrode current collector, and the negative membrane includes a first coating layer and a second coating layer. The first coating layer is located on an outermost layer of the negative membrane and includes a first negative active material including a silicon-based material and a carbon material, and in the first coating layer, a mass percentage of the silicon-based material is 0.5% to 10%. The second coating layer is disposed between the first coating layer and the negative electrode current collector and includes a second negative active material including a silicon-based material and a carbon material, and in the second coating layer, a mass percentage of the silicon-based material is 5%-50%.

14 Claims, 2 Drawing Sheets

(51) Int. Cl.
*H01M 4/36* (2006.01)
*H01M 4/38* (2006.01)
*H01M 4/48* (2010.01)
*H01M 4/587* (2010.01)
*H01M 4/62* (2006.01)
*H01M 10/0525* (2010.01)
*H01M 4/02* (2006.01)

(52) U.S. Cl.
CPC ........... *H01M 4/483* (2013.01); *H01M 4/587* (2013.01); *H01M 4/622* (2013.01); *H01M 4/625* (2013.01); *H01M 10/0525* (2013.01); *H01M 2004/027* (2013.01)

(56) References Cited

U.S. PATENT DOCUMENTS

| | | |
|---|---|---|
| 10,270,086 B2 | 4/2019 | Sugimori et al. |
| 10,454,096 B2 | 10/2019 | Kim et al. |
| 2002/0048705 A1 | 4/2002 | Park et al. |
| 2013/0224584 A1 | 8/2013 | Sung et al. |
| 2015/0280221 A1 | 10/2015 | Abdelsalam et al. |
| 2016/0329557 A1* | 11/2016 | Sugimori ............... H01M 4/483 |
| 2016/0351892 A1* | 12/2016 | Sugimori ............... H01M 4/483 |
| 2018/0062158 A1 | 3/2018 | Kim et al. |

FOREIGN PATENT DOCUMENTS

| | | |
|---|---|---|
| CN | 103201882 A | 7/2013 |
| CN | 104885262 A | 9/2015 |
| CN | 105742613 A | 7/2016 |
| CN | 105849954 A | 8/2016 |
| CN | 106030864 A | 10/2016 |
| CN | 107785535 A | 3/2018 |
| CN | 108550857 A | 9/2018 |
| JP | 2018181539 A | 11/2018 |
| KR | 20190019854 A | 2/2019 |

\* cited by examiner

NEGATIVE ELECTRODE PLATE, SECONDARY BATTERY, AND APPARATUS THEREOF

CROSS-REFERENCE TO RELATED APPLICATIONS

The present application is a continuation of International Application No. PCT/CN2020/077138, filed on Feb. 28, 2020, which claims priority to Chinese Patent Application No. 201910155560.7, filed to the Chinese Patent Office on Mar. 1, 2019 and entitled "NEGATIVE ELECTRODE PLATE, SECONDARY BATTERY, AND APPARATUS THEREOF", and the entire content of which is incorporated herein by reference.

TECHNICAL FIELD

The present application relates to the field of batteries, and in particular, to a negative electrode plate, a secondary battery and an apparatus thereof.

BACKGROUND

In recent years, the field of new energy vehicles has developed rapidly, and power batteries have attracted attention and favor of major auto manufacturers around the world. As car companies have increasingly high requirements for the specific energy of power batteries, it is a must-do to develop electrode active materials with higher specific energy. Common negative active materials are mainly graphite, but its theoretical specific capacity is only 372 mAh/g. In addition, the actual specific capacities of current commercial artificial graphite and natural graphite are close to their theoretical specific capacities, which cannot be further improved, thereby limiting the improvement of the specific energy of the power batteries. Therefore, new negative active materials with higher specific capacity are required to develop.

Silicon-based materials have attracted wide attention from researchers because of their high theoretical specific capacities (usually greater than 4200 mAh/g) and abundant resources. However, silicon-based materials have a large volume expansion during a charge process. At the same time, silicon-based materials also have the problem of low first charge and discharge efficiency, resulting in low first charge and discharge efficiency of power batteries as well.

Therefore, how to make power batteries containing silicon-based materials also meet the requirements of usage is a common problem faced by the industry at present.

SUMMARY

In view of the problems in the Background, a purpose of the present application is to provide a negative electrode plate, a secondary battery and an apparatus thereof. The secondary battery can have characteristics of high specific energy, high first charge and discharge efficiency, good cycle performance and good safety performance.

In order to achieve the above purpose, in a first aspect of the present application, the present application is provided with a negative electrode plate, which includes a negative electrode current collector and a negative membrane disposed on the negative electrode current collector, and the negative membrane includes a first coating layer and a second coating layer. The first coating layer is located on an outermost layer of the negative membrane and includes a first negative active material, the first negative active material includes a silicon-based material and a carbon material, and in the first coating layer, a mass percentage of the silicon-based material is 0.5% to 10%. The second coating layer is disposed between the first coating layer and the negative electrode current collector and includes a second negative active material, the second negative active material includes a silicon-based material and a carbon material, and in the second coating layer, a mass percentage of the silicon-based material is 5% to 50%.

In a second aspect of the present application, the present application is provided with a secondary battery, which includes the negative electrode plate in the first aspect of the present application.

In a third aspect of the present application, the present application is provided with an apparatus, which includes the secondary battery in the second aspect of the present application.

The present application at least includes the following beneficial effects: the negative electrode plate of the present application includes a negative membrane having a multi-layer structure, where the mass percentage of the silicon-based material in the outer layer structure of the negative membrane is small, and the mass percentage of the silicon-based material in the inner layer structure is large, so that the probability of breaking of the SEI film on the surface of the negative membrane during the charge and discharge process is greatly reduced, as a result, a degree of irreversibility of ion is also reduced, further, the first charge and discharge efficiency and the cycle performance of the secondary battery can also be better improved, and the high content of the silicon-based material in the inner layer structure can ensure that the secondary battery has a high specific energy. The apparatus of the present application includes the secondary battery in the second aspect of the present application, and thus has at least the same advantages as the secondary battery.

Figure 1:
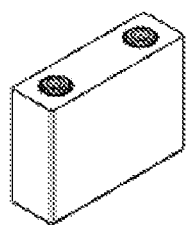
FIG. 1 is a schematic diagram of an embodiment of a secondary battery of the present application.

Where:
1—Battery pack;
2—Upper box;
3—Lower box;
4—Battery module; and
5—Secondary battery

DESCRIPTION OF EMBODIMENTS

The following describes a negative electrode plate, a secondary battery and an apparatus thereof according to the present application in detail.

The negative electrode plate according to the first aspect of the present application is described first.

The negative electrode plate according to the first aspect of the present application includes a negative electrode current collector and a negative membrane disposed on the negative electrode current collector. The negative membrane includes a first coating layer and a second coating layer, where the first coating layer is located on an outermost layer of the negative membrane and includes a first negative active material. The first negative active material includes a silicon-based material and a carbon material, and in the first coating layer, a mass percentage of the silicon-based material is 0.5% to 10%. The second coating layer is disposed between the first coating layer and the negative electrode current collector, and includes a second negative active material. The second negative active material includes a silicon-based material and a carbon material, and in the second coating layer, a mass percentage of the silicon-based material is 5% to 50%.

The specific energy of the secondary battery is closely related to the specific capacity of the negative active material. Generally, the higher the specific capacity of the negative active material is, the more beneficial it is to increase the specific energy of the secondary battery. The silicon-based material has a relatively high theoretical specific capacity, so when used as a negative active material of the secondary battery, the negative active material can achieve the purpose of increasing the specific energy of the secondary battery. However, the silicon-based material expands greatly in volume during the charge process, and a large expansion stress generated inside the silicon-based material will damage a structure of the silicon-based material. The structural damage of the silicon-based material will not only destroy the electrical contact between the silicon-based materials, but may also cause the negative membrane to fall off from the negative electrode current collector, making the extraction and insertion process of ions unable to proceed smoothly. In addition, the degree of irreversibility of the ions during the extraction and insertion process will increase, which not only reduces the first charge and discharge efficiency of the secondary battery, but also affects the cycle performance and safety performance of the secondary battery. Meanwhile, due to the relatively large volume expansion of the silicon-based material during charge and discharge process, the SEI film on the surface of the negative membrane will continue to be broken and repaired, consuming a large amount of ions, resulting in an increasing on the degree of ion irreversibility, which will also affect the cycle performance of the secondary battery.

The negative membrane of the present application disposed on the negative electrode current collector has a multilayer structure. The first coating layer located on the outermost layer of the negative membrane includes a silicon-based material and a carbon material, and the second coating layer located between the first coating layer and the negative electrode current collector also includes a silicon-based material and a carbon material, but the difference is that the mass percentage of the silicon-based material in the first coating layer is less than the mass percentage of the silicon-based material in the second coating layer. Compared with a conventional single-layered carbon-based negative electrode plate, the secondary battery of the present application can have a higher specific energy. Compared with a single-layered silicon-based negative electrode plate, the surface of the negative membrane with a multilayer structure has relatively low content of the silicon-based material, so that during the charge and discharge process of the secondary battery, the probability of breaking the SEI film on the surface of the negative membrane is greatly reduced, and thus the degree of irreversibility of ion is also reduced, and the cycle performance of the secondary battery can be well improved.

In the first coating layer, the higher the mass percentage of the silicon-based material is, the more beneficial it is to increase the specific energy of the secondary battery. However, due to the relatively large volume expansion of the silicon-based material during the charge process, the probability of breaking the SEI film on the surface of the negative membrane increases, and as a result, the degree of irreversibility of ion increases. Meanwhile, the mass percentage of the silicon-based material should not be too small, so that the expansion stress of the first coating layer and the second coating layer is likely to differ too much, and then the interface compatibility between the first coating layer and the second coating layer becomes poor, which will also affect the performance of the secondary battery.

Therefore, in the first coating layer, the mass percentage of the silicon-based material is 0.5%-10%. Preferably, the mass percentage of the silicon-based material is 0.5%-5%.

In the second coating layer, the higher the mass percentage of the silicon-based material is, the more beneficial it is to increase the specific energy of the secondary battery. However, if the mass percentage of the silicon-based material is too great, the difference of the expansion stress borne by the first coating layer and the second coating layer is too great, so that the interface compatibility between the first coating layer and the second coating layer becomes poor, which will also affect the performance of the secondary battery.

Therefore, in the second coating layer, the mass percentage of the silicon-based material is 5%-50%. Preferably, in the second coating layer, the mass percentage of the silicon-based material is 10%-40%.

In addition, in the negative electrode plate of the present application, since the first coating layer and the second coating layer both contain the silicon-based material and the carbon material, the first coating layer and the second coating layer can have good interface compatibility, thereby alleviating the problem of uneven expansion stress of two coating layers during the charge process. However, if the difference between the mass percentage of the silicon-based material in the first coating layer and the second coating layer is too small, it will have no significant difference essentially compared with the conventional single-layered negative electrode plate, thereby failing to reflect advantages of multilayer structural design of the negative membrane. If the difference in the mass percentage of the silicon-based material in the first coating layer and the second coating layer differs too great, it will cause the difference in the expansion stress between the first coating layer and the second coating layer to be too great, so that the first coating layer and the second coating layer may be separated and demolded during the charge and discharge process of the secondary battery.

Preferably, the difference between the mass percentage of the silicon-based material in the second coating layer and the mass percentage of the silicon-based material in the first coating layer is 5%-35%. Further preferably, the difference between the mass percentage of the silicon-based material in the second coating layer and the mass percentage of the silicon-based material in the first coating layer is 10%-30%.

In addition, the difference between the mass percentage of the carbon material in the first coating layer and the second coating layer will also affect the performance of the secondary battery. If the difference between the mass percentage of the carbon material in the first coating layer and the second coating layer is too small, it will have no significant difference essentially compared with the conventional single-layered negative electrode plate, thereby failing to reflect advantages of multilayer structural design of the negative membrane. If the difference in the mass percentage of the carbon material in the first coating layer and the second coating layer differs too great, it will cause the difference in the expansion stress between the first coating layer and the second coating layer to be too great, so that the first coating layer and the second coating layer may be separated and demolded during the charge and discharge process of the secondary battery.

Preferably, the difference between the mass percentage of the carbon material in the first coating layer and the mass percentage of the carbon material in the second coating layer is 10%-40%. Further preferably, the difference between the mass percentage of the carbon material in the first coating layer and the mass percentage of the carbon material in the second coating layer is 10%-20%.

In the negative electrode plate according to the first aspect of the present application, preferably, a thickness of the first coating layer is 20 μm to 80 μm. Further preferably, the thickness of the first coating layer is 20 μm-50 μm.

In the negative electrode plate according to the first aspect of the present application, preferably, a thickness of the second coating layer is 40 μm to 140 μm. Further preferably, the thickness of the second coating layer is 60 μm-100 μm.

In the negative electrode plate according to the first aspect of the present application, preferably, a ratio of the thickness of the first coating layer to the thickness of the second coating layer is 0.2-5. Further preferably, the ratio of the thickness of the first coating layer to the thickness of the second coating layer is 0.2-2. More preferably, the ratio of the thickness of the first coating layer to the thickness of the second coating layer is 0.5-1.

In the negative electrode plate according to the first aspect of the present application, the negative membrane further includes a miscible diffusion layer disposed between the first coating layer and the second coating layer, and the miscible diffusion layer is formed by miscibility and diffusion between the first coating layer and the second coating layer. The presence of the miscible diffusion layer can further improve the interface compatibility between the first coating layer and the second coating layer, increase the bonding force between the first coating layer and the second coating layer, and prevent the second coating layer from falling off from the first coating layer, so that the safety performance of the secondary battery can be further improved.

Preferably, a thickness of the miscible diffusion layer is 1 μm-20 μm. Further preferably, the thickness of the miscible diffusion layer is 3 μm-10 μm.

In the negative electrode plate according to the first aspect of the present application, the silicon-based material may be selected from one or more of amorphous silicon, crystalline silicon, silicon-carbon composite, silicon-oxygen compound, and silicon alloys. The carbon material can be selected from one or more of artificial graphite, natural graphite, and mesocarbon microbeads.

In the negative electrode plate according to the first aspect of the present application, preferably, in the first coating layer, a sum of a mass percentage of the silicon-based material and the carbon material is 89.5% to 99%.

In the negative electrode plate according to the first aspect of the present application, preferably, in the second coating layer, a sum of a mass percentage of the silicon-based material and the carbon material is 87% to 98%.

In the negative electrode plate according to the first aspect of the present application, both the first coating layer and the second coating layer may further include a binder and a conductive agent, where the type and content of the binder and the conductive agent are not specifically limited, which can be selected according to actual needs. It should be noted that the binder in the first coating layer and the binder in the second coating layer may be the same or different. Preferably, the binder in the first coating layer and the binder in the second coating layer are the same, so that the first coating layer and the second coating layer can better dissolve and diffuse each other to form a miscible diffusion layer.

Preferably, in the first coating layer later, a mass percentage of the binder is 0.5% to 8%.

Preferably, in the first coating layer later, a mass percentage of the conductive agent is 0.5% to 2.5%.

Preferably, in the second coating layer later, a mass percentage of the binder is 1% to 10%.

Preferably, in the second coating layer later, a mass percentage of the conductive agent is 1% to 3%.

Preferably, the binder can be selected from one or more of polyacrylic acid, sodium polyacrylate, sodium alginate, polyacrylonitrile, polyethylene glycol, and carboxymethyl chitosan.

Preferably, the conductive agent may be selected from one or more of acetylene black, Ketjen black, conductive carbon black, and carbon nanotubes.

In the negative electrode plate according to the first aspect of the present application, the preparation method of the negative electrode plate may include the steps of:

(1) Preparation of the first negative electrode slurry: disperse the silicon-based material, the carbon material, the binder and the conductive agent in deionized water in a certain proportion, and stir for 0.5 h~8 h;

(2) Preparation of the second negative electrode slurry: disperse the silicon-based material, the carbon material, the binder and the conductive agent in the deionized water in a certain proportion, and stir for 0.5 h~8 h;

(3) Preparation of negative electrode plate: coat the second negative electrode slurry on the negative electrode current collector to form the second coating layer, and then coat the first negative electrode slurry on the second coating layer to form the first coating layer, and then cold press and slit to obtain a negative electrode plate.

Then the secondary battery according to the second aspect of the present application is described.

The secondary battery according to the second aspect of the present application includes a positive electrode plate, a negative electrode plate, an electrolyte and a separator, where the negative electrode plate is the negative electrode plate according to the first aspect of the present application.

In the secondary battery according to the second aspect of the present application, the type of the separator is not specifically limited, and the separator may be, but is not limited to, any separator material used in existing batteries, for example, polyethylene, polypropylene, polyvinylidene fluoride, and a multilayer composite film thereof.

In the secondary battery according to the second aspect of the present application, specific types and compositions of the electrolyte are not specifically limited, and may be selected according to actual needs.

It should be noted that the secondary battery according to the second aspect of the present application may be a lithium-ion battery, a sodium-ion battery, and any other secondary battery using the negative electrode plate according to the first aspect of the present application. Preferably, the secondary battery according to the second aspect of the present application is a lithium-ion battery.

When the secondary battery is a lithium-ion battery, the positive active material in the positive electrode plate can be selected from one or more of lithium transition metal composite oxides, but the present application is not limited thereto. Preferably, the positive active material may be one or more of lithium cobalt oxide, lithium manganese oxide, lithium nickel cobalt manganese oxide, lithium nickel manganese oxide, lithium nickel cobalt aluminium oxide and lithium iron phosphate.

In some embodiments, the secondary battery may include an outer package for encapsulating the positive electrode plate, the negative electrode plate and the electrolyte. As an example, the positive electrode plate, the negative electrode plate and the separator may be laminated or wound to form an electrode assembly with a laminated structure or an electrode assembly with a wound structure, and the electrode assembly is encapsulated in an outer package. The electrolyte may be an electrolyte solution, and the electrolyte solution is infiltrated in the electrode assembly. There may be one or more electrode assemblies in the secondary battery, and their quantity may be adjusted as required.

In some embodiments, the outer package of the secondary battery may be a soft package, for example, a soft bag package. A material of the soft package may be plastic, for example, may include one or more of polypropylene (PP), polybutylene terephthalate (PBT), polybutylene succinate (PBS), and the like. The outer package of an electrochemical apparatus may be a hard shell, for example, an aluminum shell.

The present application has no particular limitation on the shape of the secondary battery, and the secondary battery may be of a cylindrical, square, or any other shape. FIG. 1 shows an electrochemical apparatus 5 of a square structure as an example.

In some embodiments, secondary batteries may be assembled into a battery module, and the battery module may include a plurality of secondary batteries. A specific quantity may be adjusted based on application and capacity of the battery module.

Figure 2:
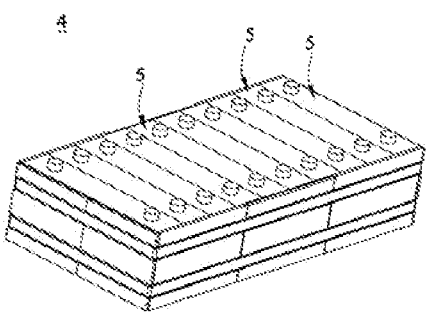
FIG. 2 is a schematic diagram of an embodiment of a battery module of the present application.

FIG. 2 shows a battery module 4 as an example. Referring to FIG. 2, in the battery module 4, a plurality of secondary batteries 5 may be sequentially arranged along a length direction of the battery module 4, certainly, may be arranged in any other manner. Further, the plurality of secondary batteries 5 may be fixed by using fasteners.

Optionally, the battery module 4 may further include a housing with an accommodating space, and the plurality of secondary batteries 5 are accommodated in the accommodating space.

In some embodiments, the above battery modules may be further assembled into a battery pack, and a quantity of battery modules included in the battery pack may be adjusted based on application and capacity of the battery pack.

Figure 3:
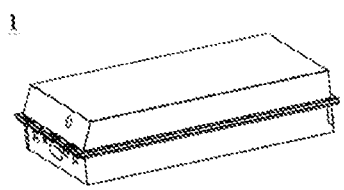
FIG. 3 is a schematic diagram of an embodiment of a battery pack of the present application.
Figure 4:
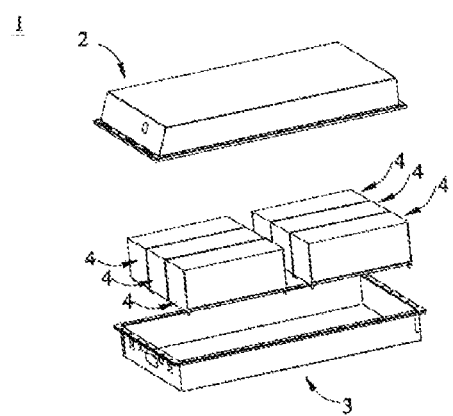
FIG. 4 is an exploded diagram of FIG. 3.

FIG. 3 and FIG. 4 show a battery pack 1 as an example. Referring to FIG. 3 and FIG. 4, the battery pack 1 may include a battery box and a plurality of battery modules 4 disposed in the battery box. The battery box includes an upper box body 2 and a lower box body 3. The upper box body 2 can cover the lower box body 3 and form an enclosed space for accommodating the battery modules 4. The plurality of battery modules 4 may be arranged in the battery box in any manner.

Finally, an apparatus according to the third aspect of the present application is described, which includes the secondary battery in the second aspect of the present application. The secondary battery supplies power to the apparatus. The apparatus may be, but is not limited to, a mobile device (for example, a mobile phone or a notebook computer), an electric vehicle (for example, a full electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

A secondary battery, a battery module, or a battery pack may be selected according to requirements for using the apparatus.

Figure 5:
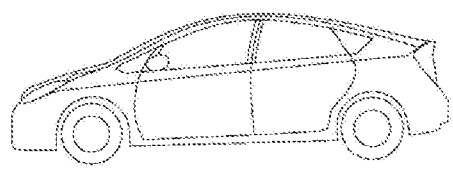
FIG. 5 is a schematic diagram of an embodiment of an apparatus using the secondary battery of the present application as a power source.

FIG. 5 shows an apparatus as an example. The apparatus is a full electric vehicle, a hybrid electric vehicle, a plug-in hybrid electric vehicle, or the like. In order to meet a requirement of the apparatus for high power and a high energy density of the electrochemical apparatus, a battery pack or a battery module may be used.

In another example, the apparatus may be a mobile phone, a tablet computer, a notebook computer, or the like. The apparatus usually requires lightness and thinness, and a secondary battery may be used as a power source.

The following further describes the present application with reference to embodiments. It should be understood that these embodiments are merely intended to illustrate the present application but not to limit the scope of the present application.

In embodiments 1-12 and comparative examples 1-7, a lithium-ion battery is prepared according to the following method.

(1) Preparation of the Positive Electrode Plate

Mix the positive active material $LiNi_{0.8}Co_{0.1}Mn_{0.1}O_2$, a conductive agent acetylene black, and a binder PVDF in a mass ratio of 96:2:2, add a solvent NMP, and stir under the action of a vacuum mixer until the system is uniform to obtain a positive electrode slurry; and uniformly coat the positive electrode slurry on aluminum foil of the positive electrode current collector and transfer to an oven for further drying after being dried at room temperature, and then after cold press and slit, the positive electrode plate is obtained.

(2) Preparation of the Negative Electrode Plate

Mix the first negative active material, the binder, and the conductive agent shown in Table 1 in proportion, add solvent deionized water, and stir under the action of a vacuum mixer until the system is uniform to obtain a first negative electrode slurry; mix the second negative active material, the binder, and the conductive agent in Table 2 in proportion, add the solvent deionized water, and stir under the action of a vacuum mixer until the system is uniform to obtain a second negative electrode slurry; uniformly coat the second negative slurry and the first negative slurry on copper foil of the negative electrode current collector using a single layer extrusion method, transfer to an oven for further drying after being dried at a room temperature, and then after cold press and slit, the negative electrode plate is obtained.

(3) Preparation of the Electrolyte

Mix ethylene carbonate (EC), ethyl methyl carbonate (EMC) and diethyl carbonate (DEC) in a volume ratio of 1:1:1 to obtain an organic solvent, then, the fully dried lithium salt $LiPF_6$ is dissolved in the mixed organic solvent, and an electrolytic solution with a concentration of 1 mol/L is prepared.

(4) Preparation of the Separator

A polyethylene film is used as the separator.

(5) Preparation of the Lithium-Ion Battery

Stack the above positive electrode plate, the separator, and the negative electrode plate in order, so that the separator is placed between the positive and negative electrode plates as a means of isolation, and then perform winding to obtain an electrode assembly; and place the electrode assembly in an outer package, inject the electrolyte after drying, and perform steps such as vacuum packaging, standing, forming, and shaping to obtain the lithium-ion battery.

TABLE 1

Parameters of the first coating layer of embodiments 1-12 and comparative examples 1-7

| | First Negative Active Material | | | | Binder | | Conductive agent | | Thickness (μm) |
|---|---|---|---|---|---|---|---|---|---|
| | Type of silicon-based material | Content | Type of carbon material | Content | Type | Content | Type | Content | |
| Embodiment 1 | Si | 1% | Artificial graphite | 95% | Polyacrylic acid | 3% | Conductive carbon black | 1% | 30 |
| Embodiment 2 | Si | 0.5% | Artificial graphite | 95.5% | Polyacrylic acid | 3% | Conductive carbon black | 1% | 30 |
| Embodiment 3 | Si | 3% | Artificial graphite | 93% | Polyacrylic acid | 3% | Conductive carbon black | 1% | 30 |
| Embodiment 4 | Si | 4% | Artificial graphite | 92% | Polyacrylic acid | 3% | Conductive carbon black | 1% | 30 |
| Embodiment 5 | Si | 5% | Artificial graphite | 91% | Polyacrylic acid | 3% | Conductive carbon black | 1% | 30 |
| Embodiment 6 | Si | 5% | Artificial graphite | 91% | Polyacrylic acid | 3% | Conductive carbon black | 1% | 40 |
| Embodiment 7 | Si | 5% | Artificial graphite | 91% | Polyacrylic acid | 3% | Conductive carbon black | 1% | 40 |
| Embodiment 8 | Si | 5% | Artificial graphite | 91% | Polyacrylic acid | 3% | Conductive carbon black | 1% | 40 |
| Embodiment 9 | Si | 5% | Artificial graphite | 91% | Polyacrylic acid | 3% | Conductive carbon black | 1% | 40 |
| Embodiment 10 | Si | 3% | Natural graphite | 92% | Sodium Alginate | 3% | Conductive carbon black | 2% | 40 |
| Embodiment 11 | $SiO_x$ | 5% | Natural graphite | 93% | Polyacrylonitrile | 1% | Conductive carbon black | 1% | 40 |
| Embodiment 12 | Si | 0.5% | Natural graphite | 95.5% | Carboxymethyl chitosan | 3% | Conductive carbon black | 1% | 40 |
| Comparative Example 1 | — | — | — | — | — | — | — | — | — |
| Comparative Example 2 | — | — | — | — | — | — | — | — | — |
| Comparative Example 3 | — | — | — | — | — | — | — | — | — |
| Comparative Example 4 | Si | 1% | Artificial graphite | 95% | Polyacrylic acid | 3% | Conductive carbon black | 1% | 40 |
| Comparative Example 5 | Si | 1% | Artificial graphite | 95% | Polyacrylic acid | 3% | Conductive carbon black | 1% | 40 |
| Comparative Example 6 | Si | 96% | — | — | Polyacrylic acid | 3% | Conductive carbon black | 1% | 40 |
| Comparative Example 7 | — | — | Artificial graphite | 96% | Polyacrylic acid | 3% | Conductive carbon black | 1% | 40 |

TABLE 2

Parameters of the second coating layer in embodiments 1-12 and comparative examples 1-7

| | Second Negative Active Material | | | | Binder | | Conductive agent | | Thickness (μm) |
|---|---|---|---|---|---|---|---|---|---|
| | Type of silicon-based material | Content | Type of carbon material | Content | Type | Content | Type | Content | |
| Embodiment 1 | SiOx | 20% | Artificial graphite | 70% | Polyacrylic acid | 8.5% | Conductive carbon black | 1.5% | 90 |
| Embodiment 2 | SiOx | 25% | Artificial | 65% | Polyacrylic acid | 8.5% | Conductive | 1.5% | 90 |

TABLE 2-continued

Parameters of the second coating layer in embodiments 1-12 and comparative examples 1-7

| | Second Negative Active Material | | | | | | | | Thickness (μm) |
|---|---|---|---|---|---|---|---|---|---|
| | Type of silicon-based material | Content | Type of carbon material | Content | Binder Type | Content | Conductive agent Type | Content | |
| 2 | | | graphite | | | | carbon black | | |
| Embodiment 3 | SiOx | 25% | Artificial graphite | 65% | Polyacrylic acid | 8.5% | Conductive carbon black | 1.5% | 90 |
| Embodiment 4 | SiOx | 25% | Artificial graphite | 65% | Polyacrylic acid | 8.5% | Conductive carbon black | 1.5% | 90 |
| Embodiment 5 | SiOx | 25% | Artificial graphite | 65% | Polyacrylic acid | 8.5% | Conductive carbon black | 1.5% | 90 |
| Embodiment 6 | SiOx | 30% | Artificial graphite | 60% | Polyacrylic acid | 8.5% | Conductive carbon black | 1.5% | 80 |
| Embodiment 7 | SiOx | 35% | Artificial graphite | 55% | Polyacrylic acid | 8.5% | Conductive carbon black | 1.5% | 80 |
| Embodiment 8 | SiOx | 40% | Artificial graphite | 50% | Polyacrylic acid | 8.5% | Conductive carbon black | 1.5% | 80 |
| Embodiment 9 | SiOx | 25% | Artificial graphite | 65% | Sodium Alginate | 8.5% | Conductive carbon black | 1.5% | 80 |
| Embodiment 10 | SiOx | 30% | Artificial graphite | 60% | Sodium Alginate | 8.5% | Conductive carbon black | 1.5% | 80 |
| Embodiment 11 | SiOx + Si | 15% + 15% | Natural graphite | 60% | Polyacrylonitrile | 10% | Conductive carbon black | 2.0% | 80 |
| Embodiment 12 | Si | 20% | Natural graphite | 70% | Carboxymethyl chitosan | 8.5% | Conductive carbon black | 1.5% | 80 |
| Comparative Example 1 | SiOx | 90% | — | — | Polyacrylic acid | 8.5% | Conductive carbon black | 1.5% | 120 |
| Comparative Example 2 | — | — | Artificial graphite | 90% | Polyacrylic acid | 8.5% | Conductive carbon black | 1.5% | 120 |
| Comparative Example 3 | SiOx | 68% | Artificial graphite | 24% | Binder | 6.0% | Conductive carbon black | 2.0% | 120 |
| Comparative Example 4 | SiOx | 90% | — | — | Polyacrylic acid | 8.5% | Conductive carbon black | 1.5% | 120 |
| Comparative Example 5 | — | — | Artificial graphite | 90% | Polyacrylic acid | 8.5% | Conductive carbon black | 1.5% | 120 |
| Comparative Example 6 | SiOx | 30% | Artificial graphite | 60% | Polyacrylic acid | 8.5% | Conductive carbon black | 1.5% | 120 |
| Comparative Example 7 | SiOx | 30% | Artificial graphite | 60% | Polyacrylic acid | 8.5% | Conductive carbon black | 1.5% | 120 |

The following describes the performance test of the lithium-ion battery.

(1) Specific Energy Test of the Lithium-Ion Battery

The lithium-ion battery is charged to the upper limit voltage at a rate of 1/3C at room temperature, and then discharged to the lower limit voltage at a rate of 1/3C to obtain the energy during the discharge process of the lithium-ion battery.

The specific energy of the lithium-ion battery (Wh/Kg)=the energy during the discharge process of the lithium-ion battery/the mass of the lithium-ion battery.

(2) First Charge and Discharge Efficiency Test of the Lithium-Ion Battery

The lithium-ion battery is converted to 3.75V at a small rate of 0.05C at room temperature, then charged to the upper limit voltage at a rate of 1/3C, and then discharged to the lower limit voltage at a rate of 1/3C to obtain the first charge capacity and the first discharge capacity of the lithium-ion battery.

The first charge and discharge efficiency (%) of the lithium-ion battery=the first discharge capacity of the lithium-ion battery/the first charge capacity of the lithium-ion battery×100%.

(3) Cycle Performance Test of the Lithium-Ion Battery

Charge and discharge the lithium-ion battery at a 1C rate at room temperature to perform a charge-discharge cycle test. First, discharge to the lower limit voltage at 1C rate, stand for 5 minutes, then charge to the upper limit voltage at 1C rate, stand for 5 minutes, repeat the above charge and discharge steps until the discharge capacity of the lithium-ion battery decays to 80% of the first discharge capacity, and record the number of cycles of the lithium-ion battery at this time.

TABLE 3

Performance test results of embodiments 1-12 and comparative examples 1-7

| | Thickness of the miscible diffusion layer (μm) | Specific energy (Wh/Kg) | First charge and discharge efficiency | The number of cycles at which the discharge capacity decays to 80% |
|---|---|---|---|---|
| Embodiment 1 | 5 | 232 | 85.20% | 910 cycles |
| Embodiment 2 | 5 | 240 | 81.30% | 840 cycles |
| Embodiment 3 | 5 | 242 | 79.30% | 860 cycles |
| Embodiment 4 | 5 | 244 | 78.20% | 860 cycles |
| Embodiment 5 | 5 | 246 | 77.06% | 880 cycles |
| Embodiment 6 | 5 | 252 | 75.10% | 800 cycles |
| Embodiment 7 | 5 | 255 | 74.60% | 750 cycles |
| Embodiment 8 | 5 | 258 | 73.80% | 720 cycles |
| Embodiment 9 | 5 | 246 | 77.22% | 835 cycles |
| Embodiment | 5 | 264 | 75.80% | 750 cycles |

TABLE 3-continued

Performance test results of embodiments 1-12 and comparative examples 1-7

| | Thickness of the miscible diffusion layer (μm) | Specific energy (Wh/Kg) | First charge and discharge efficiency | The number of cycles at which the discharge capacity decays to 80% |
|---|---|---|---|---|
| Embodiment 10 | 5 | 265 | 74.90% | 780 cycles |
| Embodiment 11 | 5 | 228 | 86.40% | 950 cycles |
| Embodiment 12 | / | 312 | 61.20% | 50 cycles |
| Comparative Example 1 | / | 214 | 89.50% | 1600 cycles |
| Comparative Example 2 | / | 284 | 65.60% | 800 cycles |
| Comparative Example 3 | 5 | 298 | 63.60% | 100 cycles |
| Comparative Example 4 | 5 | 218 | 88.30% | 1350 cycles |
| Comparative Example 5 | 5 | 278 | 65.20% | 120 cycles |
| Comparative Example 6 | 5 | 234 | 78.80% | 300 cycles |
| Comparative Example 7 | | | | |

From the analysis to the test results in Table 3, it can be known that the negative membranes of Comparative Examples 1-3 are all arranged in a single-layer structure, where the negative membrane of Comparative Example 1 only contains the silicon-based material and does not contain the carbon material, the active specific surface area of the contact reaction of active lithium-ions with Si is relatively large, and the negative electrode plate generates serious heat. Although lithium-ion batteries have relatively high specific energy, the first charge and discharge efficiency of the lithium-ion battery is relatively poor, and in the meantime, the cycle performance of the lithium-ion battery is relatively poor. The negative membrane of Comparative Example 2 only contains the carbon material and does not contain the silicon-based material. Although the first charge and discharge efficiency of the lithium-ion battery is relatively high, in the meantime, the cycle performance is relatively good, but it is difficult to obtain a lithium-ion battery with high specific energy, and thus it is difficult to meet the actual requirements for usage. The negative membrane of Comparative Example 3 contains both the carbon material and the silicon-based material. Although the heat generated by the negative electrode is reduced compared with Comparative Examples 1, its first charge and discharge efficiency is still low, and difficult to meet the actual requirements for usage.

Although the negative membranes of Comparative Examples 4-7 are also arranged in a multilayer structure, the first coating layer or the second coating layer cannot meet the requirements of containing both the silicon-based material and the carbon material at the same time, which results in a poor interface compatibility of the first coating layer and the second coating layer. In addition, when the difference in the content of the silicon-based material and the carbon material between the first coating layer and the second coating layer is too large, the difference in the expansion stress between the first coating layer and the second coating layer during the charge process is too large, the interface compatibility between the first coating layer and the second coating layer will be further deteriorated, and the first coating layer will easily fall off. The lithium-ion battery cannot simultaneously take into account high specific energy, high first charge and discharge efficiency and good cycle performance, thereby affecting the usage of the lithium-ion battery.

The negative membrane of Embodiments 1-12 has a multilayer structure, which includes a first coating layer located in the outermost layer and a second coating layer located between the first coating layer and the negative electrode current collector, in the meantime, the content of the silicon-based material and the carbon material in the first coating layer and the second coating layer is moderate. At this time, the lithium-ion battery has high specific energy and high first charge and discharge efficiency, in the meantime, the lithium-ion battery can also have good cycle performance From further analysis to the test results of Embodiments 1-9, it can be found that the higher the overall content of the silicon-based material is contained in the negative membrane, the higher the specific energy of the lithium-ion battery will be, but corresponding first charge and discharge efficiency and cycle performance of the lithium-ion battery will be slightly affected. In the meantime, the greater difference is in the mass percentage of the silicon based material between the first coating layer and the second coating layer, the greater impact will be on the cycle performance of the lithium-ion battery. But as long as the mass percentage of the silicon based material in the first coating layer and second coating layer is controlled within an appropriate range, the lithium-ion battery can have high specific energy and have high first charge and discharge efficiency, as well as good cycle performance.

From further analysis to the test results of Embodiments 2-5, it can be found that the specific energy and cycle performance of the lithium-ion battery can be gradually improved, as the content of the silicon-based material in the first coating layer increases, but the first charge and discharge efficiency of the lithium-ion battery will decrease slightly.

From further analysis to the test results of Embodiments 6-9, it can be found that the specific energy of the lithium-ion battery can be gradually improved as the content of the silicon-based material in the second coating layer increases, but the first charge and discharge efficiency and the cycle performance of the lithium-ion battery will decrease slightly.

From further analysis to the test results of Embodiments 10-12, it can be found that the first coating layer and the second coating layer use a binder different from that in Embodiments 1-9 and the lithium-ion battery can still have a high specific energy and have high first charge and discharge efficiency as well as good cycle performance

What is claimed is:

1. A negative electrode plate, comprising a negative electrode current collector and a negative membrane disposed on the negative electrode current collector,
   wherein the negative membrane comprises:
   a first coating layer, located on an outermost layer of the negative membrane and comprising a first negative active material, a conductive agent, and a binder, the first negative active material comprising a silicon-based material and a carbon material; and
   a second coating layer, disposed between the first coating layer and the negative electrode current collector and comprising a second negative active material, a conductive agent, and a binder, the second negative active material comprising a silicon-based material and a carbon material;

a thickness of the first coating layer is 20 µm to 50 µm, and a thickness of the second coating layer is 60 µm to 100 µm;

in the first coating layer, a mass percentage of the silicon-based material is 0.5% to 5%, a mass percentage of the carbon material is at least 91%, a mass percentage of the binder is 1% to 3%, a mass percentage of the conductive agent is 0.5% to 2.5%; and, in the second coating layer, a mass percentage of the silicon-based material is 20% to 40%, a mass percentage of the carbon material is 50% to 70%, a mass percentage of the binder is 6% to 10%, a mass percentage of the conductive agent is 1% to 3%;

wherein a difference between a mass percentage of the carbon material in the first coating layer and a mass percentage of the carbon material in the second coating layer is 20% to 40%;

a difference between the mass percentage of the silicon-based material in the second coating layer and the mass percentage of the silicon-based material in the first coating layer is 10% to 40%;

wherein the silicon-based material of the first coating layer and the second coating layer comprises one or more of amorphous silicon, crystalline silicon, silicon-carbon composite, silicon-oxygen compound, and silicon alloys;

wherein the carbon material comprises one or more of artificial graphite, natural graphite, and mesocarbon microbeads, wherein the conductive agent comprises one or more of acetylene black, Ketjen black, conductive carbon black, and carbon nanotubes, wherein the binder comprises one of more of polyacrylic acid, sodium polyacrylate, sodium alginate, polyacrylonitrile, polyethylene glycol, and carboxymethyl chitosan.

2. The negative electrode plate according to claim 1, wherein in the first coating layer, the mass percentage of the silicon-based material is 0.5% to 5%.

3. The negative electrode plate according to claim 1, wherein the difference between the mass percentage of the silicon-based material in the second coating layer and the mass percentage of the silicon-based material in the first coating layer is 10% to 30%.

4. The negative electrode plate according to claim 1, wherein the negative membrane further comprises a miscible diffusion layer disposed between the first coating layer and the second coating layer, and the miscible diffusion layer is formed by miscibility and diffusion between the first coating layer and the second coating layer.

5. The negative electrode plate according to claim 1, wherein the thickness of the first coating layer is 30 µm to 40 µm; and/or the thickness of the second coating layer is 80 µm to 90 µm.

6. The negative electrode plate according to claim 1, wherein a ratio of the thickness of the first coating layer to the thickness of the second coating layer is 0.2 to 1.

7. The negative electrode plate according to claim 6, wherein the ratio of the thickness of the first coating layer to the thickness of the second coating layer is 1:3 to 1:2.

8. The negative electrode plate according to claim 4, wherein a thickness of the miscible diffusion layer is 1 µm to 20 µm.

9. The negative electrode plate according to claim 8, wherein the thickness of the miscible diffusion layer is 3 µm to 10 µm.

10. A secondary battery, comprising a positive electrode plate, a negative electrode plate, a separator disposed between the positive electrode plate and the negative electrode plate, and an electrolyte, wherein the negative electrode plate further comprises a negative electrode current collector and a negative membrane disposed on the negative electrode current collector, wherein the negative membrane comprises:

a first coating layer, located on an outermost layer of the negative membrane and comprising a first negative active material, a conductive agent, and a binder, the first negative active material comprising a silicon-based material and a carbon material; and a second coating layer, disposed between the first coating layer and the negative electrode current collector and comprising a second negative active material, a conductive agent, and a binder, the second negative active material comprising a silicon-based material and a carbon material;

wherein a thickness of the first coating layer is 20 µm to 50 µm, and a thickness of the second coating layer is 60 µm to 100 µm;

wherein, in the first coating layer, a mass percentage of the silicon-based material is 0.5% to 5%, a mass percentage of the carbon material is at least 91%, a mass percentage of the binder is 1% to 3%, a mass percentage of the conductive agent is 0.5% to 2.5%;

wherein, in the second coating layer, a mass percentage of the silicon-based material is 20% to 40%, a mass percentage of the carbon material is 50% to 70%, a mass percentage of the binder is 6% to 10%, a mass percentage of the conductive agent is 1% to 3%;

wherein a difference between a mass percentage of the carbon material in the first coating layer and a mass percentage of the carbon material in the second coating layer is 20% to 40%;

wherein a difference between the mass percentage of the silicon-based material in the second coating layer and the mass percentage of the silicon-based material in the first coating layer is 10% to 40%;

wherein the silicon-based material of the first coating layer and the second coating layer comprises one or more of amorphous silicon and crystalline silicon, silicon-oxygen compound;

wherein the carbon material comprises one or more of artificial graphite, natural graphite, and mesocarbon microbeads;

wherein the conductive agent comprises one or more of acetylene black, Ketjen black, conductive carbon black, and carbon nanotubes;

wherein the binder comprises one of more of polyacrylic acid, sodium polyacrylate, sodium alginate, polyacrylonitrile, polyethylene glycol, and carboxymethyl chitosan.

11. The secondary battery according to claim 10, wherein a ratio of the thickness of the first coating layer to the thickness of the second coating layer is 1:3 to 1:2.

12. The secondary battery according to claim 10, wherein the thickness of the first coating layer is 30 µm to 40 µm; and the thickness of the second coating layer is 80 µm to 90 µm.

13. The secondary battery according to claim 10, wherein in the first coating layer, the mass percentage of the silicon-based material is 0.5% to 5%.

14. An apparatus, comprising the secondary battery according to claim 10.

\* \* \* \* \*